United States Patent
Saur et al.

[11] Patent Number: 5,292,064
[45] Date of Patent: Mar. 8, 1994

[54] COVER FOR A HOUSED THERMOSTAT

[75] Inventors: Roland Saur, Stuttgart; Friedrich Bauer, Kornwestheim; Peter Leu, Denkendorf, all of Fed. Rep. of Germany

[73] Assignee: Behr-Thomson-Dehnstoffregler GmbH & Co., Fed. Rep. of Germany

[21] Appl. No.: 35,075

[22] Filed: Mar. 22, 1993

[30] Foreign Application Priority Data

Apr. 3, 1992 [DE] Fed. Rep. of Germany ....... 9204611

[51] Int. Cl.⁵ ............................................. F01P 7/161
[52] U.S. Cl. .................................................. 236/345
[58] Field of Search ............................. 236/34, 34.5

[56] References Cited

U.S. PATENT DOCUMENTS

| | | | |
|---|---|---|---|
| 3,700,166 | 10/1972 | Foults | 236/34.5 |
| 3,817,450 | 6/1974 | Mischke | 236/34.5 |
| 3,858,800 | 1/1975 | Wong | 236/34 |
| 4,344,564 | 8/1982 | Magnuson | 236/34.5 |
| 4,674,679 | 6/1987 | Saur | 236/34.5 |
| 4,679,530 | 7/1987 | Kuze | 236/34.5 X |
| 4,883,225 | 11/1989 | Kitchens | 236/34.5 |
| 5,129,577 | 7/1992 | Kuze | 236/34.5 |
| 5,195,467 | 3/1993 | Kurz | 236/34.5 X |

FOREIGN PATENT DOCUMENTS

| | | |
|---|---|---|
| 8700216.7 | of 0000 | Fed. Rep. of Germany . |
| 8801797.4 | of 0000 | Fed. Rep. of Germany . |
| 8808932.0 | of 0000 | Fed. Rep. of Germany . |
| 9104964.4 | of 0000 | Fed. Rep. of Germany . |

*Primary Examiner*—William E. Tapolcai
*Attorney, Agent, or Firm*—Evenson, McKeown, Edwards & Lenahan

[57] ABSTRACT

A cover for a housed thermostat having a thermostat valve which is held on the cover, forms a main valve and a short-circuit valve and contains a thermostatic working element whose housing is connected with the main valve disk. The cover has a projection which surrounds the housing of the working element in a cage-type manner and is molded to the main valve disk which is manufactured as a molded plastic part. The end of the projection projects over the housing of the working element and forms part of the short-circuit valve.

12 Claims, 2 Drawing Sheets

COVER FOR A HOUSED THERMOSTAT

BACKGROUND AND SUMMARY OF THE INVENTION

The present invention relates to a cover for a housed thermostat comprising a thermostat valve which is held on the cover, forms a main valve and a short-circuit valve, and contains a thermostatic working element the housing of which is connected with a main valve disk which is loaded by a closing spring in the direction of a valve seat, the closing spring being supported on holding devices connected with the cover.

A cover of the above-described type is shown, for example, in German Patent Document DE-U 88 797.4, and forms a constructional unit together with the thermostat valve. This constructional unit can be tested separately, that is, without being installed into the housing, with respect to the tightness of the main valve. In the cover shown in the German Patent Document, a main valve disk made of sheet metal is fastened to the housing of the thermostatic working element. The closing spring of the main valve disk is supported against a bow which is hung into finger-type holding elements which are molded onto the cover. The housing of the thermostatic working element is lengthened by means of a metallic pin on which a short-circuit valve disk with a slideway is arranged. The short-circuit valve spring is situated between this valve disk and the housing of the working element.

German Patent Document DE-U 91 04 964.4 shows a main valve disk of a thermostat valve manufactured as a plastic molded part which is held on the housing of the thermostatic working element in a form-locking manner. The sealing surface of the main valve disk is provided with a recess into which a sealing ring is inserted.

German Patent Document DE-U 88 08 932.0 shows the fastening of a sleeve on the housing of the thermostatic working element which forms a slide for a slide valve. By means of its end, this sleeve dips into a recess of a housing.

German Patent Document DE-U 87 00 216.7 shows the fitting of a cap-type part on the end of a housing of a thermostatic working element, which part forms a chamber with the housing in which an electric heating element is arranged in the form of a PTC-resistance.

It is also known, in the case of thermostat valves, to guide the short-circuit valve disk on several pins which are fastened to the main valve disk. These pins are surrounded by pressure springs against the force of which the short circuit valve disk can be slid on the pins.

An object of the present invention is to provide a cover for a housed thermostat of the initially mentioned type in such a manner that the manufacturing costs are reduced.

This and other objects are achieved by the present invention which provides a cover for a housed thermostat, the housed thermostat having a thermostat valve which is held on the cover and forms a main valve and a short-circuit valve. The thermostat valve contains a thermostatic working element with a housing and a main valve disk connected with the housing of the thermostatic working element. The cover comprises a projection molded to the main valve disk and is a molded plastic part that surrounds the housing of the working element in a cage-type manner. An end of the projection projects over the housing of the working element and forms a part of the short-circuit valve.

The present invention retains the advantage that the cover forms a constructional unit with the thermostat valve which can be tested separately, particularly with respect to the tightness of the valve seat (leakage) and function, before it is installed into the housed thermostat. The design of the main valve disk makes it possible to combine the short circuit valve with the main valve disk, without the requirement that the thermostatic working element has to accommodate any parts for the short circuit valve. It is therefore easily possible to use the same thermostatic working element for thermostat valves with or without a short-circuit valve. Furthermore, shaped sheet metal parts are avoided which require increased manufacturing expenditures and which must be made of an expensive material because they must be resistant to corrosion.

In a first embodiment of the present invention, a pin is molded onto the projection of the main valve disk on which a short-circuit valve disk is guided. This short-circuit valve disk may be made of sheet metal or plastic.

In another embodiment of the present invention, the projection of the main valve disk has a bottom with a surrounding closed ring which is used as a shorting plunger. In this embodiment, the short-circuit valve is constructed as a sliding valve, the shorting plunger dipping into a corresponding bore of the housing. In order to guide the shorting plunger and to center it in the bore of the housing, it is provided in a further embodiment of the invention that the ring is extended in the axial direction by means of guide fingers.

In another embodiment of the invention, the cover is equipped with molded-on holding fingers which extend essentially in parallel to the longitudinal direction of the housing and have receiving devices pointing to the center for the support of the closing spring.

In another embodiment of the invention, an insert is mounted on the cover which is constructed as a plastic molded part and which forms an abutment for the closing spring. Also in this embodiment, the cover together with the thermostat forms a preassembled constructional unit which can therefore be tested with respect to the tightness of the valve seat and the function, while the abutment for the closing spring is not molded onto the cover.

In another embodiment, the insert has a lengthening which is equipped with window-type recesses and in which the projection of the main valve disk is guided which has a surrounding bottom with a surrounding closed ring which forms a short-circuit sliding valve with the lower edges of the window-type recesses of the insert. In this embodiment, the short-circuit sliding valve is integrated into the constructional unit which is preassembled with the cover so that the closing temperature is independent of any tolerances or the like of the housing. It need only be provided that the insert is sealingly inserted into the short-circuit line of the housing which does not present any difficulty also in the event of relatively large permissible tolerances.

In order to provide a thermostat valve which can be adjusted in a simple manner to different opening temperatures, an embodiment of the present invention provides the projection of the main valve disk with a bottom, the projection forming a chamber with the end of the housing of the thermostatic working element in which an electric heating element is arranged which rests against the bottom of the housing As a result, it becomes possible to adjust the thermostatic working element to a high opening temperature by the selection of its wax filling and nevertheless cause an opening in the case of a lower coolant temperature. By the electric heating of the thermostatic working element, a mixed temperature will then be obtained from the coolant temperature and the temperature generated by the electric heating which "simulates" to the thermostatic working element an increased coolant temperature so that this working element already opens despite the lower coolant temperature Other objects, advantages and novel features of the present invention will become apparent from the following detailed description of the invention when considered in conjunction with the accompanying drawings.

DETAILED DESCRIPTION OF THE DRAWINGS

Figure 1:
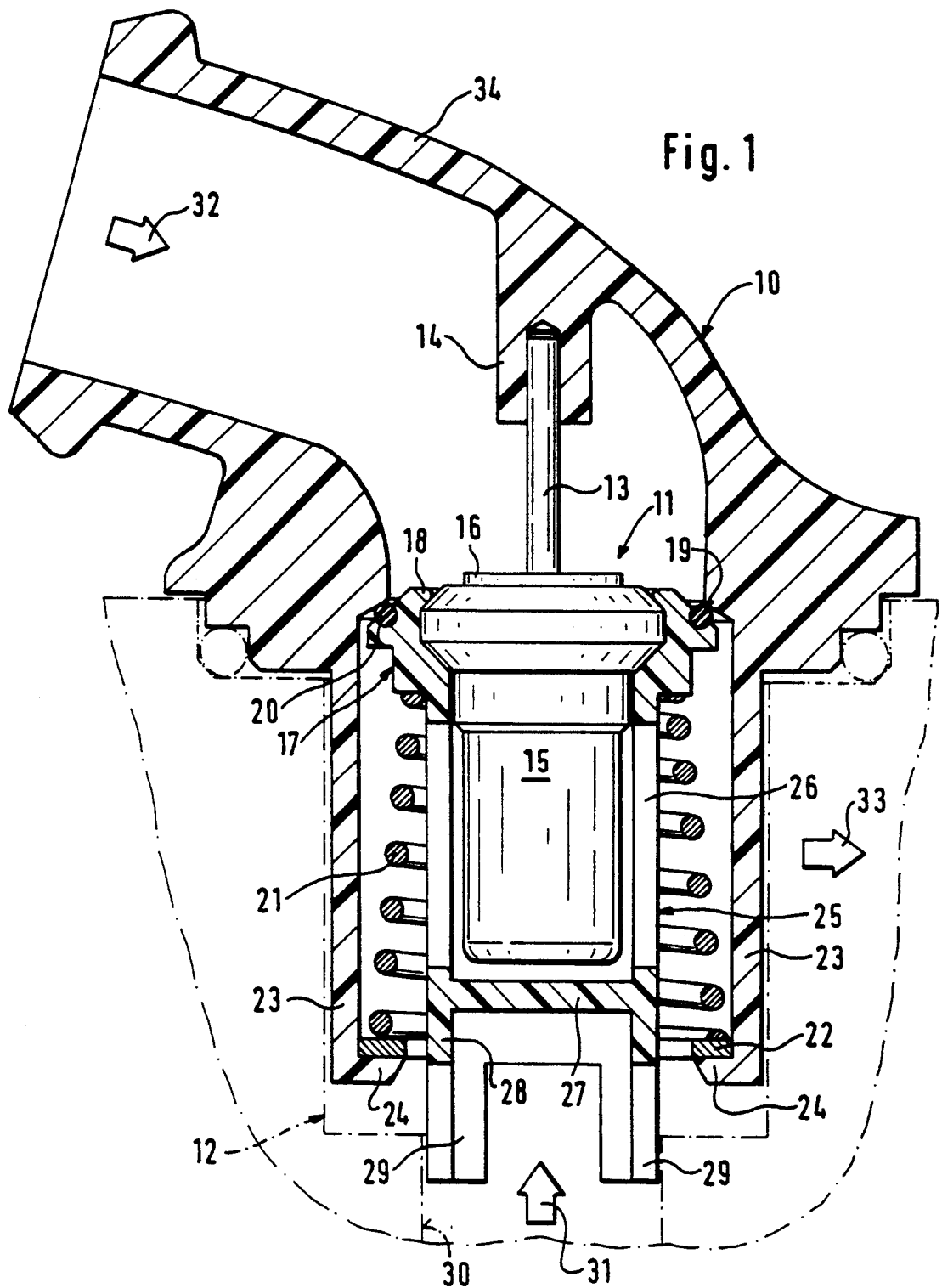
FIG. 1 is an axial sectional view of a cover for a housed thermostat constructed in accordance with a first embodiment of the present invention.

In FIG. 1, a cover 10 of a housed thermostat is illustrated which, together with a thermostat valve 11, forms a preassembled constructional unit which, as such, is inserted into the housing 12 of the housed thermostat. Only the interior countour of the housing 12 is indicated by a dash-dotted line. Since the cover 10 forms a constructional unit together with the thermostat valve 11, this preassembled constructional unit can be tested before its installation, particularly with respect to its tightness and operation.

The thermostat valve 11 comprises a thermostatic working element, the working piston 13 of which is centered and supported in a recess of a projection 14 of the cover 10. The thermostatic working element is constructed in a conventional manner. It has a housing 15 in the interior of which an expanding substance, particularly a wax mixture, is housed. In an upper thickened area, a guiding insert 16 for the working piston 13 is crimped in. In the interior of the housing 15, the working piston 13 is surrounded With a pocket-shaped membrane which is fixed in the thickened area. For a temperature that is determined on the basis of the wax mixture, the expanding substance changes its state of aggregation and in the process drives out the working piston 13 corresponding to the temperature rise. The thermostatic working element thus represents a linear servomotor.

A main valve disk 17 is fastened to the thickened area of the housing 15. This main valve disk 17 is manufactured as a molded plastic part which form-fittingly reaches around the thickened area of the housing 15 of the working element. Its end area which faces the working piston 13 is constructed as a surrounding detent lug 18 or a detent lug 18 which is divided in the circumferential direction. The valve disk 17 has a valve surface which extends at an angle of approximately 45° and to which a valve seat 19 of t he cover 10 is assigned which extends at the same angle. The valve surface of the valve disk 17, (the "main valve disk"), is provided with a surrounding ring groove into which a sealing profile 20 is inserted. In the illustrated embodiment, the sealing ring 20 is an O-ring. However, it is also easily possible to provide differently shaped sealing rings.

The main valve disk 17 is loaded in the closing direction by a closing spring 21 which is a truncated-cone-shaped coil spring in the illustrated embodiment. By means of its end situated opposite the main valve disk 17, the closing spring 21 is supported on a spring disk 22 which is held by holding fingers 23 molded to the cover 10. In a modified embodiment, the spring disk 22 has an angular cross-section and reaches around the closing spring 21 on the outside. Preferably, three holding fingers 23 are provided which are offset at angular distances of 120°. The holding fingers 23, which extend in the longitudinal direction of the housing 15 of the working element, that is, in the moving-out direction of the working piston 13, have receiving devices 24 which are directed toward the inside and on which the spring disk 22 rests. The holding fingers 23, which are elastically flexible in the transverse direction, are supported on the interior wall of the housing 12 so that an elastic yielding in the transverse direction is impossible in the installed condition. In a modified embodiment of the invention, the holding fingers 23 are provided in the area of the receiving devices with outward pointing thickenings which rest in the installed condition against the interior wall of the housing 12.

A projection 25 is molded to the main valve disk 17 produced as a molded plastic part and surrounds the housing 15 of the thermostatic working element in a cage-type manner. The projection 25 has an essentially sleeve-shaped design. In the area of the housing 15 of the thermostatic working element, it is provided with large-surface recesses 26 so that webs remain that extend only in the longitudinal direction of the housing 15. These webs are adjacent to a bottom 27 which follows the housing 15 at a narrow distance. A ring 28, connected to the bottom 27, is continued by means of several guiding fingers 29 which are uniformly spaced along the circumference of the ring 2 and which extend into a short-circuit opening 30 of the housing 12. The bottom 27 and the closed ring 28 form a shorting plunger which, together with a short-circuit opening 30, forms a sliding valve.

The illustrated housed thermostat is arranged in a coolant circulating system of an internal-combustion engine. The short-circuit opening 30 is connected in a manner that is not shown in detail directly with an inlet for the coolant coming from the internal-combustion engine which is indicated by the arrow 31. The cover 10 has a connecting sleeve 34 which is connected with the radiator from which the cooled cooling liquid flows to the thermostat valve 11 corresponding to the arrow 32. In the area between the valve seat 19 and the short-circuit opening 30, the housing 12 is provided in a manner not shown in detail with a connection from which the coolant corresponding to the arrow 33 flows back to the internal-combustion engine.

When the cold internal-combustion engine is started, the coolant delivered by a coolant pump first flows in corresponding to the arrow 31 via the short-circuit opening 30 and corresponding to the arrow 33 back to the internal-combustion engine. As soon as the coolant temperature approaches the desired operating temperature, the expansion will start of the expansion substance of the thermostatic working element. This drives the working piston 13 out of the housing 15. Since the working piston 13 is held stationarily on the cover 10, the housing 15, together with the main valve disk 17, is displaced correspondingly so that the main valve opens up and releases the coolant flow from the radiator to the internal-combustion engine corresponding to the arrows 32 and 33. At the same time, the short-circuit valve is gradually closed so that the shorting plunger having the bottom 27 and the ring 28 reduces the free cross-section to the short-circuit opening 30 until it is closed completely.

The guiding fingers 29 project into the short-circuit opening 30 also when the thermostat valve 11 is closed, that is, in the position illustrated in FIG. 1, so that the projection 25 of the main valve disk 17 is centered with respect to the short-circuit opening 30 in any operating condition.

Figure 2:
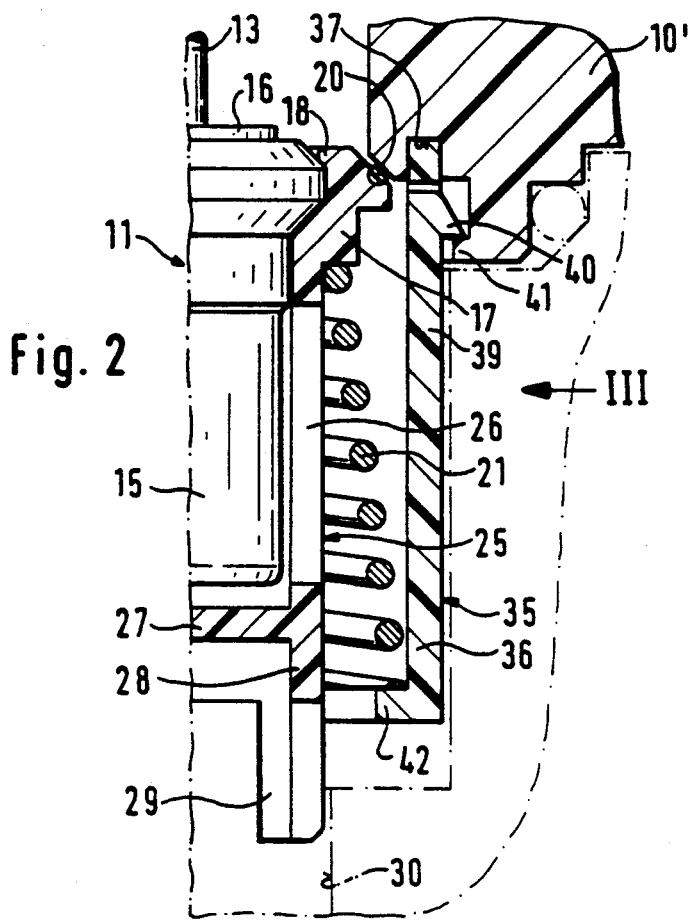
FIG. 2 is a partial sectional view of another embodiment of the present invention.
Figure 3:
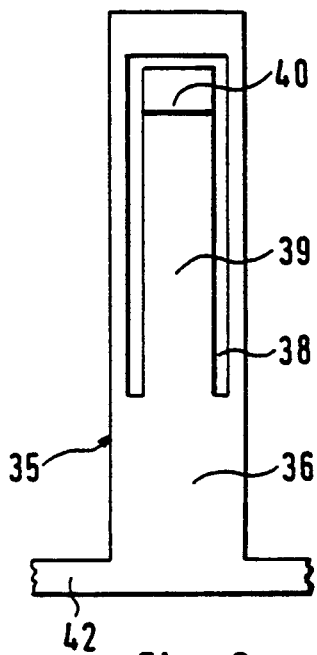
FIG. 3 is a view in the direction of the arrow III of FIG. 2.

In the embodiment according to FIGS. 2 and 3, an insert 35 is fastened to the cover 10' as a holding device for the closing spring 21. The insert 35, which is manufactured as a molding plastic part, is inserted by means of two diametrically opposite lugs 36 into recesses 37 of the cover 10'. The lugs 36 center and guide the insert 35 in the recesses 37. Since two opposite lugs 36 exist, a tilting is also securely prevented. One flexible tongue 39 respectively is worked by means of a U-shaped recess 38 into the lugs 36 having a partially cylindrical shell-shaped design, the end of the elastic tongue 39 being provided with a detent projection 40. The detent projections 40 lock with a collar 41 of the cover 10'. At the ends which are situated opposite the detent projections 40, the lugs 36 of the insert 35 carry a ring 42 on which the closing spring 21 is supported. In a modified embodiment, the ring 42 has an angular cross-section so that the closing spring 21 extends in a surrounding manner.

Also, the embodiment according to FIGS. 2 and 3, the cover 10' together with the thermostat valve 11 forms a preassembled constructional unit which as such may be subjected to functional testing, particularly to a test with respect to its tightness.

Figure 4:
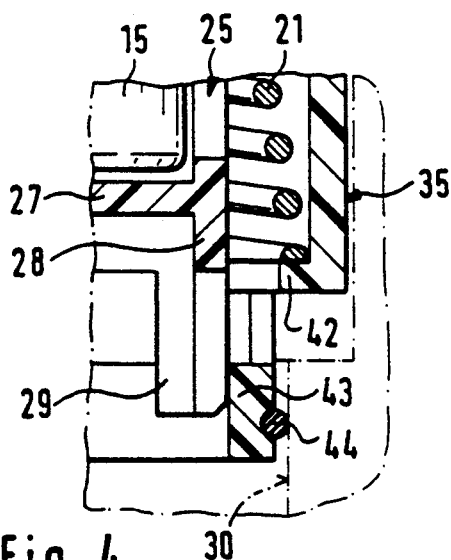
FIG. 4 is a partial sectional view of another embodiment of the present invention.

FIG. 4 illustrates another embodiment in which the insert 35 is provided with a cylindrical lengthening 43 which is connected to the ring 42 and by means of which the insert 35 is fitted into the short-circuit opening 30 of the housing 15. In the area adjacent to the ring 42, the cylindrical lengthening 43 is provided with window-type recesses. Thus, together with the bottom 27 and the closed ring 28 of the projection 25, the cylindrical lengthening 43 forms the short-circuit valve which, in this embodiment also, is constructed as a sliding valve. The cylindrical lengthening 43 is provided with a surrounding groove into which a sealing ring 44 is inserted which rests against the interior wall of the short-circuit opening 30. In the case of the embodiment according to FIG. 4, it is therefore provided that the short-circuit valve is also part of the preassembled constructional unit and is largely independent of the construction and possible tolerances of the housing 15.

Figure 5:
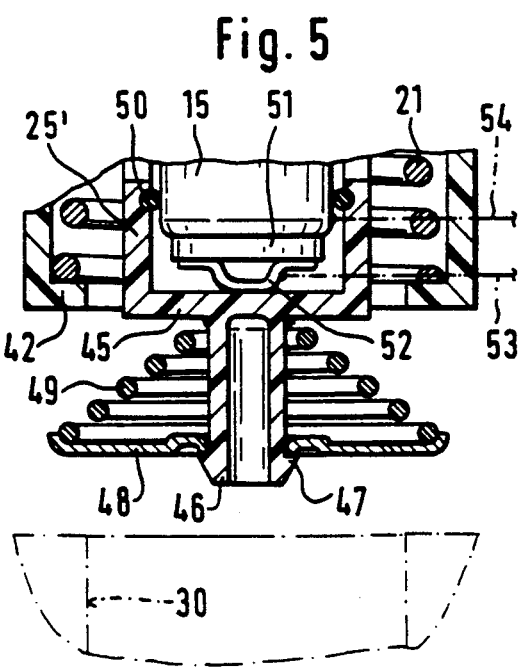
FIG. 5 is a partial sectional view of another embodiment of the present invention.

In the embodiment according to FIG. 5, a pin 46, which is longer in the axial dimension, is molded to a bottom 45 of the projection 25' of the main valve disk. This pin 46, the end of which is provided with a detent projection 47, is used as a guide for a short-circuit valve disk 48. The short-circuit valve disk 48 is loaded by a short-circuit spring 49 which is supported on the bottom 45 of the projection 25'. The short-circuiting spring 49 is a truncated-cone-shaped coil spring. The short-circuit valve disk 48 is situated opposite short-circuit opening 30 of the housing 15 and, when the coolant operating temperature is reached, is placed against this short-circuit opening 30 and closes it off.

Together with its bottom 45, the projection 25' forms a chamber which encloses the end of the thermostatic working element and is sealed off toward the outside by means of a sealing ring 50. Inside this chamber, a heating element 51 in the form of a PTC-resistance is arranged which rests against the bottom of the housing 15 of the thermostatic working element and is loaded by a bow spring 52 toward the bottom of the working element 15. The bow spring 52 and the housing 15 are connected by electric lines 53, 54 indicated by an interrupted line. It is therefore possible to heat up the thermostatic working element by the supply of auxiliary energy and thus cause it to open the main valve (and close the short-circuit valve) although the cooling temperature has not yet reached the opening temperature. Thus, it is possible to control the thermostat valve on the whole by an intervention from the outside.

It is also easily possible, in the case of the embodiments according to FIGS. 1 to 4, to construct in the area of the end of the housing 15 by means of the projection 25 a sealed-off chamber in which a corresponding electric heating element 51 is arranged. Likewise, it is naturally also possible to provide the pin 46 with the short-circuit valve disk 48 in the embodiments according to FIGS. 1 to 4.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A cover for a housed thermostat, the housed thermostat having a main housing and a thermostat valve which is held on the cover and forms a main valve and a short-circuit valve, the thermostat valve containing a thermostatic working element with a housing and a main valve disk connected with the housing of the thermostatic working element, the cover comprising:
   a projection molded to the main valve disk and which is a molded plastic part that surrounds the housing of the working element in a cage-type manner, an end of the projection projecting over the housing of the working element and forming a part of the short-circuit valve.

2. A cover according to claim 1, further comprising a pin molded to the projection of the main valve disk, wherein a short-circuit valve disk of the thermostat valve is guided on said pin.

3. A cover according to claim 2, wherein the pin has a detent projection pin over which the short-circuit valve is pushed, and further comprising:
   a short-circuit spring that loads the short-circuit valve in the direction of the detent projection;
   and a ring shoulder on the projection of the main valve disk, the ring shoulder supporting the short-circuit spring.

4. A cover according to claim 1, wherein the projection of the main valve disk has a bottom with a surrounding closed ring which operates as a shorting plunger.

5. A cover according to claim 4, wherein the ring is extended in the axial direction by guide fingers 6. A cover according to one of claim 1, further comprising holding fingers molded to the main housing which extend essentially in parallel to a longitudinal axis of the housing of the working element, said holding fingers having receiving devices which point inward for supporting a closing spring.

7. A cover according to claim 1, further comprising an insert mounted on the main housing which is constructed as a molded plastic part and which forms an abutment for a closing spring.

8. A cover according to claim 7, wherein the cover includes recesses and the insert includes at least two lugs that are insertable into the recesses of the cover.

9. A cover according to claim 7, further comprising spring detents that hold the insert on the cover.

10. A cover according to 7, wherein the insert has a cylindrical lengthening with window-type recesses and in which the projection of the main valve disk is guided by guide fingers and has a bottom with a surrounding closed ring which forms a short-circuit sliding valve together with lower edges of the window-type recesses.

11. A cover according to claim 1, wherein the projection of the main valve disk has a bottom which, together with the end of the housing of the working element, forms a chamber in which an electric heating element is arranged which rests against a bottom of the housing.

12. A cover according to claim 11, wherein the heating element is loaded by a contact spring in the direction of the end of the housing of the working element.

* * * * *